US009171582B2

(12) United States Patent
Bopp et al.

(10) Patent No.: US 9,171,582 B2
(45) Date of Patent: Oct. 27, 2015

(54) RUGGED HARD DRIVE

(71) Applicant: Raytheon Company, Waltham, MA (US)

(72) Inventors: Jayson K. Bopp, Fishers, IN (US); Sarah L. Palmer, New Palestine, IN (US)

(73) Assignee: Raytheon Company, Waltham, MA (US)

( * ) Notice: Subject to any disclaimer, the term of this patent is extended or adjusted under 35 U.S.C. 154(b) by 157 days.

(21) Appl. No.: 13/953,365

(22) Filed: Jul. 29, 2013

(65) Prior Publication Data

US 2015/0029655 A1  Jan. 29, 2015

(51) Int. Cl.
| | |
|---|---|
| H05K 5/00 | (2006.01) |
| G11B 33/08 | (2006.01) |
| G06F 1/16 | (2006.01) |
| G06F 1/18 | (2006.01) |
| G11B 33/12 | (2006.01) |

(52) U.S. Cl.
CPC .............. *G11B 33/08* (2013.01); *G06F 1/1658* (2013.01); *G06F 1/187* (2013.01); *G11B 33/124* (2013.01)

(58) Field of Classification Search
CPC ....... G06F 1/187; G06F 1/1656; G06F 1/184; G11B 33/088
See application file for complete search history.

(56) References Cited

U.S. PATENT DOCUMENTS

| | | | |
|---|---|---|---|
| 5,155,663 A | 10/1992 | Harase | |
| 6,011,217 A | 1/2000 | Chen et al. | |
| 6,094,342 A * | 7/2000 | Dague et al. | 361/679.33 |
| 6,567,265 B1 * | 5/2003 | Yamamura et al. | 361/679.34 |
| 2007/0091504 A1 * | 4/2007 | Ulrich | 360/97.01 |
| 2012/0026674 A1 | 2/2012 | Aldridge | |

OTHER PUBLICATIONS

International Search Report dated Sep. 1, 2014 in connection with International Patent Application No. PCT/US2014/040020, 4 pages.
Written Opinion of International Searching Authority dated Sep. 1, 2014 in connection with International Patent Application No. PCT/US2014/040020, 6 pages.

* cited by examiner

*Primary Examiner* — Robert J Hoffberg
*Assistant Examiner* — Hung Dang

(57) ABSTRACT

According to an embodiment of the disclosure, an apparatus includes a sleeve configured to surround a hard drive. The sleeve includes a side portion, a bottom portion, a top portion, a front portion, and a back portion. At least one of the side portion, the bottom portion, the top portion, the front, or the back portion is made of an elastomeric material configured to absorb a portion of shock or vibration from being imparted on the hard drive. Additionally, at least one of the side portion, the top portion, or the bottom portion is tapered.

20 Claims, 10 Drawing Sheets

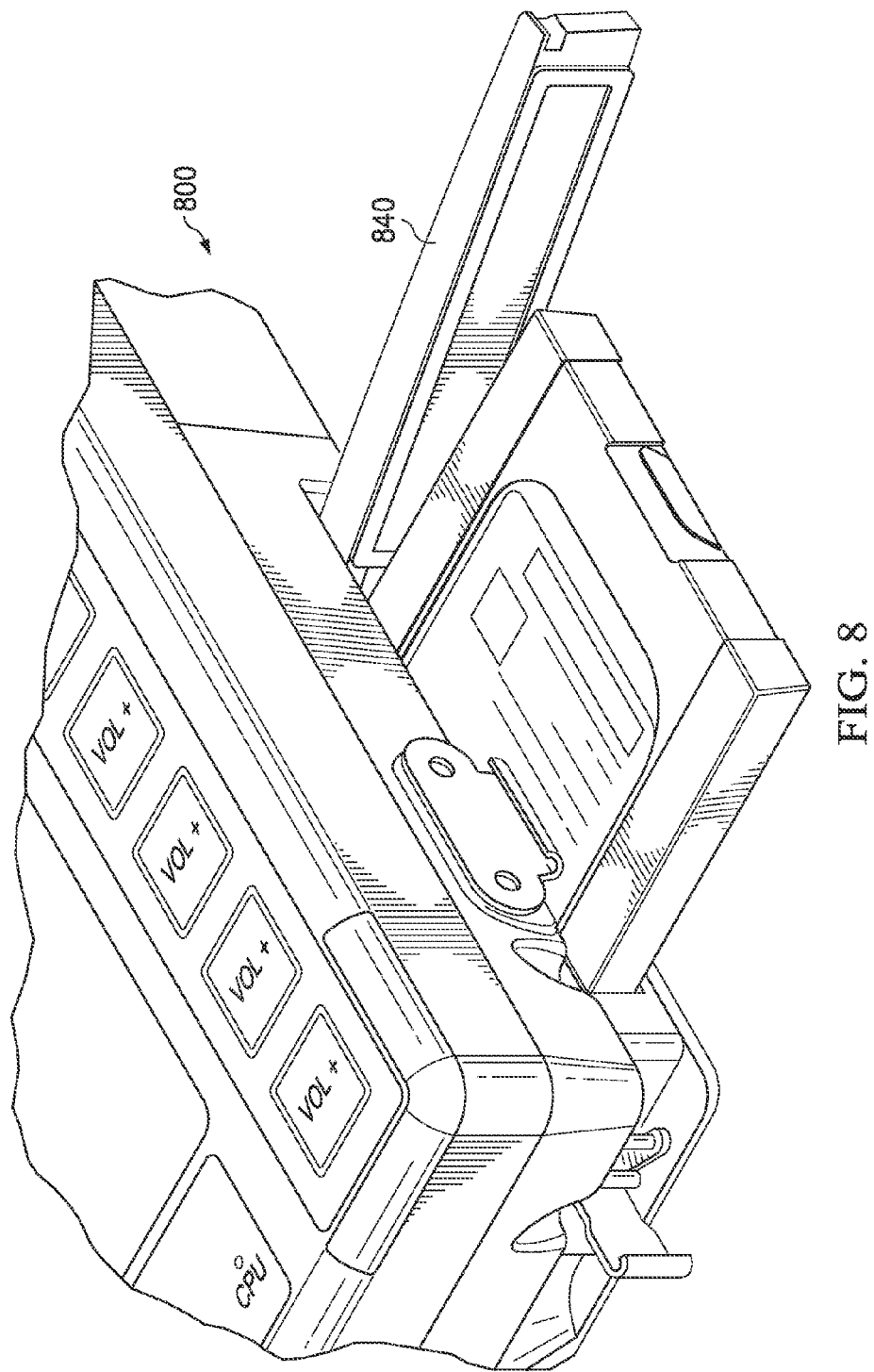

RUGGED HARD DRIVE

TECHNICAL FIELD

This disclosure is generally directed to systems that operate in ruggedized environments. More specifically, this disclosure is directed to a rugged hard drive.

BACKGROUND

Conventional computing equipment does not operate well in harsh environments. Accordingly, ruggedized computing equipment has been developed.

Such ruggedized equipment typically is customized and proprietary.

SUMMARY

This disclosure provides a sleeve that ruggedizes a hard drive.

According to an embodiment of the disclosure, an apparatus includes a sleeve configured to surround a hard drive. The sleeve includes a side portion, a bottom portion, a top portion, a front portion, and a back portion. At least one of the side portion, the bottom portion, the top portion, the front, or the back portion is made of an elastomeric material configured to absorb a portion of shock or vibration from being imparted on the hard drive. Additionally, at least one of the side portion, the top portion, or the bottom portion is tapered. Certain embodiments may provide various technical advantages depending on the implementation.

For example, a technical advantage of some embodiments may include a hard drive sleeve that can be placed around nearly any commercial off the shelf (COTS) hard drive—thereby yielding a ruggedized hard drive. A technical advantage of other embodiments may include a keying mechanism within the sleeves to allow proper placement of the yielded ruggedized hard drive in a computer or tablet. Yet another technical advantage may include placing a tab upon the sleeve to allow an easy installation and removal (even when wearing gloves) of the yielded ruggedized hard drive.

Although specific advantages are above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which:

FIGS. 7 and 8 illustrate a computer and a tablet in which the hard drive sleeve/hard drive combination may be placed, according to an embodiment of the disclosure.

DETAILED DESCRIPTION

The FIGURES, described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system.

Ruggedized hard drives that can be quickly removed from computers are needed in harsh environments. Conventional ruggedized hard drives are based on proprietary designs that utilize integrated heaters. Because of their proprietary nature, one is forced to obtain such conventional ruggedized hard drive from a select number of manufacturers—limiting available options. For example, if one wanted to upgrade a ruggedized hard drive, he or she is forced to return to one of the select manufacturers for the latest and greatest in technology. Additionally, such conventional ruggedized hard drives are not easy to install and remove, for example, when a user is wearing heavy gloves.

Given such concerns, certain embodiments of the disclosure provide a hard drive sleeve that can be placed around nearly any commercial off the shelf (COTS) hard drive—thereby yielding a ruggedized hard drive. To avoid misplacement of the hard drive, certain embodiments embed a keying mechanism within the sleeves to allow proper placement of the yielded ruggedized hard drive in a computer or tablet. Additionally, according to certain embodiments, a tab is placed upon the hard drive or sleeve to allow an easy installation and removal (even when wearing gloves) of the yielded ruggedized hard drive.

Figure 1:
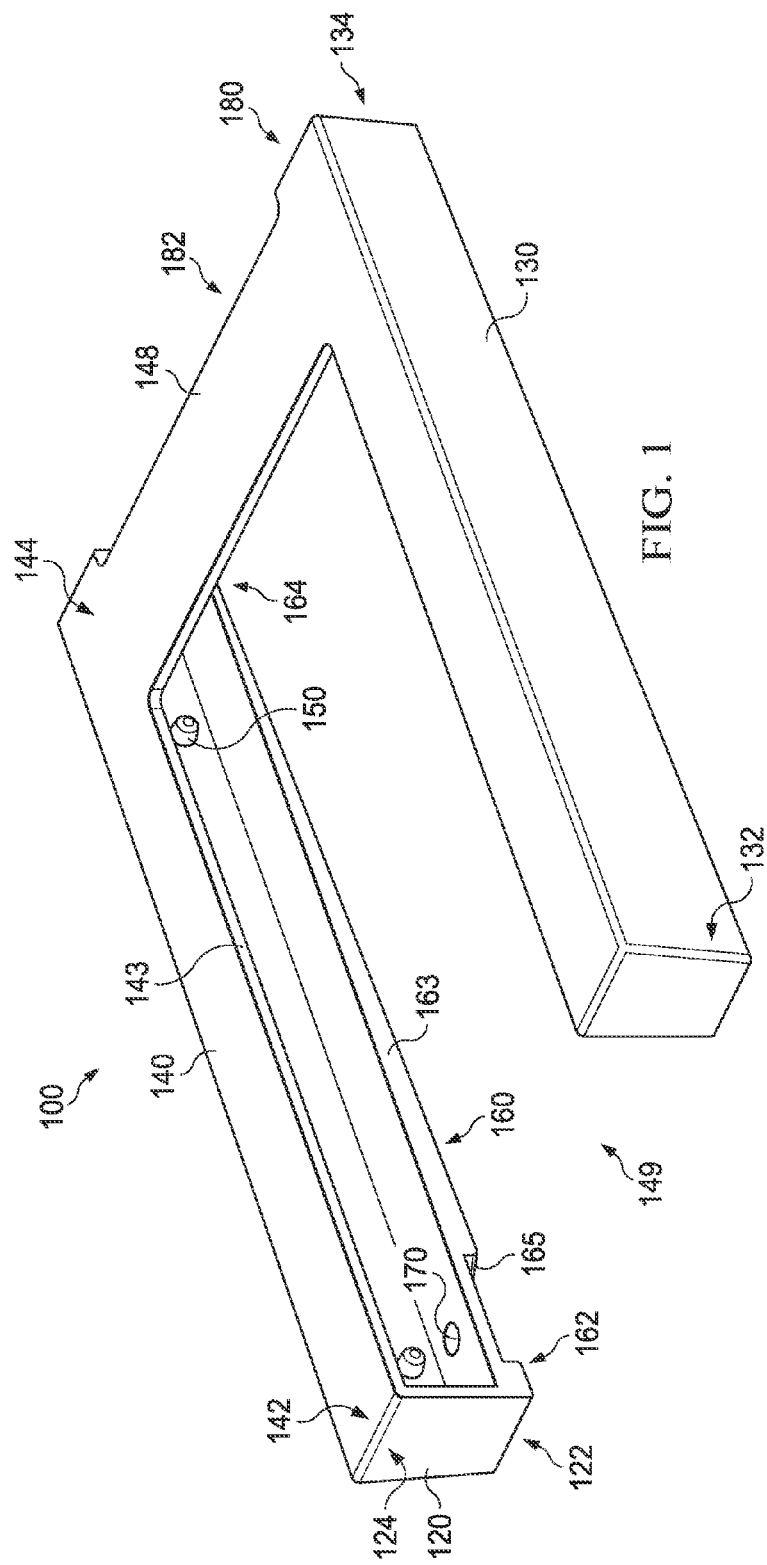
FIG. 1 is an isometric view of a hard drive sleeve, according to an embodiment of the disclosure.

FIG. 1 is an isometric view of a hard drive sleeve 100, according to an embodiment of the disclosure. In particular embodiments, the hard drive sleeve 100 can be placed around virtually any commercial off the shelf (COTS) hard drive (including rotating and solid state drives)—ruggedizing such hard drives. In particular embodiments, as improvement to hard drives occur (e.g., increased speed or capacity), such new hard drives can simply be surrounded by the hard drive sleeve 100 and utilized—taking the place of a previous drive. Such a scenario opens available options when seeking a ruggedized hard drive.

The hard drive sleeve 100 can be shaped to accommodate any suitable form factor. Additionally, as will be described in more detail below, because the communication interfaces utilize the standard communication interface on the COTS hard drive, a yielded ruggedized hard drive can easily be substituted for customized, proprietary devices.

In operation, the hard drive sleeve 100 provides shock and vibration protection to the hard drive. Such protection may be in both modes in scenarios where the hard drive is not in a computer (e.g., prior to be mounted—drop protection) and after mounting within a computer.

As seen in FIG. 1, the hard drive sleeve 100 in FIG. 1 generally includes front portions 120, back portions 180, side portions 130, top portions 140, and bottom portions 160.

The front portions 120 have a deviation from a first end 122 to a second end 124—forming a trapezoidal shape. As will be shown with reference to other figures, this trapezoidal shape generally follows the length of the hard drive sleeve 100 (e.g., through the side portions 130, top portions 140, and the bottom portions 160) to the back portions 180. Although not shown, the back portions 180 may have a similar trapezoidal shape. In particular embodiments, this trapezoidal shape allows a keying such that the hard drive will not be installed in a computer upside down. In other words, the sleeve only allows insertion in one manner. Additionally, this trapezoidal shape aligns the hard disk drive to the corresponding mating connectors in a computer or tablet in which it is installed.

Although a trapezoidal shape is shown in this configuration, in other configurations, the hard drive sleeve 100 may be keyed in a variety of other manners that either or both allows insertion in one manner or aligns the connection interfaces of the hard drive with corresponding mating connectors in a computer or tablet in which it is installed.

Each of the side portions 130, the top portions 140, and the bottom portions 160, respectively, include first ends 132, 142, and 162 as well as second ends 134, 144, and 164. In particular embodiments, the side portions 130, the top portions 140, and the bottom portions 160 can respectively be tapered from the first ends 132, 142, and 162 to the second ends 134, 144, and 164. In other words, the side portions 130, the top portions 140, and the bottom portions 160 are generally larger on the first ends 132, 142, and 162 than the second ends 134, 144, and 164. A tapering of one of the side portions 130 can be seen as a thickness 163 of bottom portion 160 generally decreases in thickness from the first end 162 to the second end 164. In particular embodiments, the tapering prevents a user from installing the hard drive backwards.

Although each of the side portions 130, the top portions 140, and the bottom portions 160 have been described as being tapered in this embodiment, in other embodiments, only certain portions may be tapered.

In operation, the hard drive sleeve 100 and associated hard drive mounted therein can be placed in a receiving portion of a computer or tablet. In configurations in which the receiving portion has a generally same tapered cross-sectional profile as the outer profile of the hard drive sleeve for receipt of the yielded ruggedized hard drive, the placement will be easy in the beginning and more difficult as the combination is inserted further—due to increased snugness from a wedging-type effect. In certain configurations, the same tapering profile between the receiving portion and the outer profile of the sleeve may aid with line-to line fitting of the hard drive to internal connections of the computer or table.

As can partially be seen in FIG. 1, an opening 182 is provided between respective back portions 180 to allow connection between the computer or tablet and respective communication interfaces on the hard drive such as, but not limited to, a serial advanced technology attachment (SATA) interface. Additionally, an opening 149 is also provided between respective top portions 140 and a top portion connector 148. The opening 149 will be described in more details below.

Mounting devices 150, which may have integrated alignment features, are also used to connect the hard drive sleeve 100 to the hard drive. In particular configurations, these mounting features are small rubber alignment features that press onto screw holes on the side of the hard drive. Although particular location and type of mounting devices 150 are shown, after reviewing this specification, one of ordinary skill in the art will recognize that other types and location of mounting devices may be utilized.

A cutout 165 in the bottom portion 160 in conjunction with a hole 170 allows attachment of a tab as will be described in more details below. In particular configurations, these holes are used for mounting the sleeve to the hard drive, as well as mounting the pull tab. However, in other configurations, screws and screw holes would not be needed if the sleeve wrapped entirely around the bottom of the hard drive and stretched onto the drive.

As described above, the hard drive sleeve 100 provides shock and vibration protection to the hard drive. A variety of suitable elastomeric materials may be utilized. As one non-limiting example, a solid vinyl molding material may be utilized. Yet other materials will become apparent to one of ordinary skill in the art after review of the specification. Such materials may include similar materials through the hard drive sleeve 100 or composites of different materials.

Figure 2A:
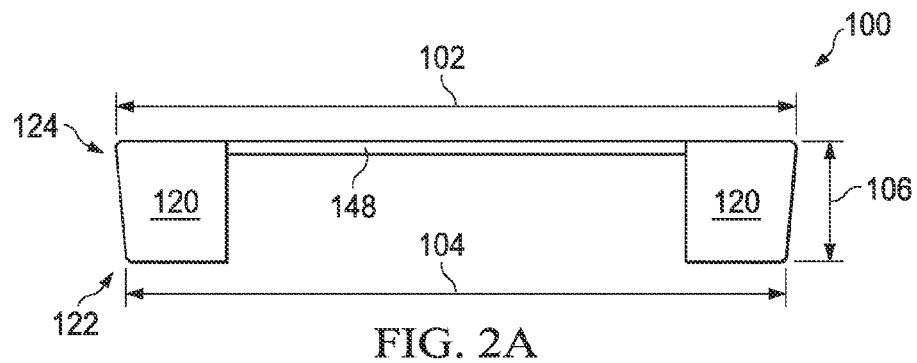
FIGS. 2A, 2B, and 2C illustrate side views of the hard drive sleeve of FIG. 1, according to an embodiment of the disclosure.
Figure 2B:
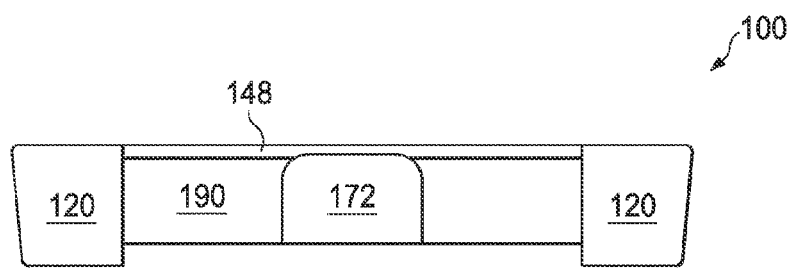
Figure 2C:
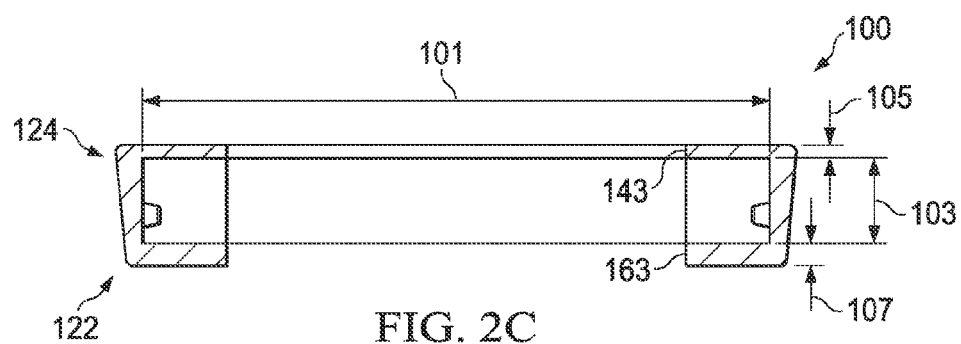

FIGS. 2A, 2B, and 2C illustrate side views of the hard drive sleeve 100 of FIG. 1. FIG. 2A shows the front portions 120 of the hard drive sleeve 100. As shown, a distance 102 measured from a second ends 124 of the front portions 120 is generally greater than a distance 104 measured from the first ends 122 of the front portions—allowing the keying or placement of the yielded hard drive in only one manner. Also shown is a distance 106, which would correspond to the maximum height of the hard drive sleeve 100—given this is the larger end of the taper as described below.

FIG. 2B shows a hard drive 190 mounted in the hard drive sleeve 100 along with the placement of a tab 172 thereon. In operation, the tab 172 allows for the easy removal of the hard drive 190/hard drive sleeve 100 combination. For example, one wearing gloves can easily grasp the tab 172 as opposed to grasping the hard drive 190. In particular, the hard drive tab 172 sticks out at an angled position. When the user pulls it, it bends to a more flat position, and when the door is shut, it bends to an upright position, but bounces back to angled position when not being touched.

FIG. 2C shows a cutaway view of the hard drive sleeve 100 of FIG. 1. The creation of the trapezoidal shape is seen where a distance 101 does not change; however, more material is contained on one side than the other.

Also seen is a thickness 143 (indicated by distance 105) and a thickness 163 (indicated by distance 107). In this particular cutaway portion, the distance 107 is greater than distance 105 due to the tapering of bottom portions 130. With reference to FIGS. 1 and 2C, the thickness 163 generally increases whereas the thickness 143 does not. In other embodiments, a vice versa scenario may occur or both may vary to create the tapering effect. In particular embodiments, a distance 103 that generally corresponds to a thickness of the hard drive may not deviate whereas the hard drive sleeve outer portion deviates as a result of tapering.

Figure 3:
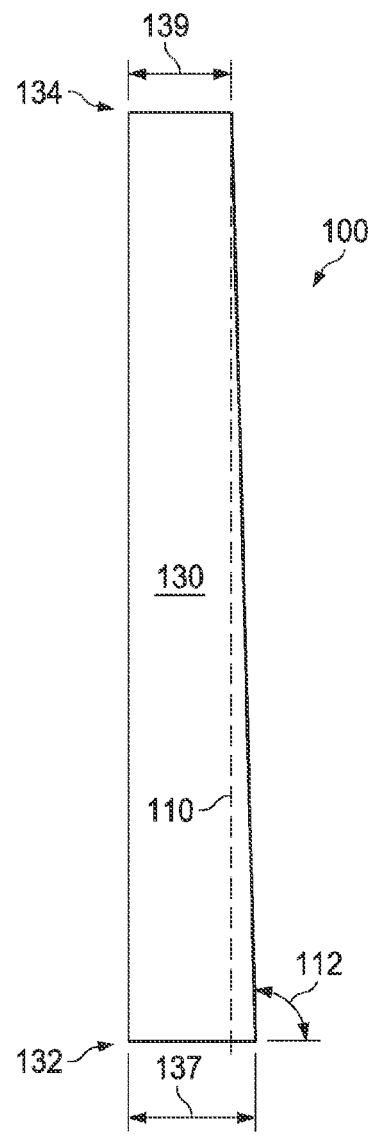
FIG. 3 is a view of the side of the hard drive sleeve of FIG. 1, according to an embodiment of the disclosure.

FIG. 3 is a view of the side portions 130 of the hard drive sleeve 100 of FIG. 1, according to an embodiment of the disclosure. This particular view illustrates a slight tapering that occurs between the first end 132 and the second end 134. Although only one side portion 130 is shown, the same may be true for the other side portion 130 as well.

As seen, a distance 137 on the first end 132 of the side portion 130 is greater than a distance 139 on the second end 134 of the side portion 130. A vertical line 110 illustrates how the slight tapering occurs. An angle of taper 112 when measured from a plane of the front portion 120 to a plane of the bottom portion 160 is between ninety and ninety-five degrees in particular embodiments. Yet other embodiments may utilize tapering greater than ninety-five degrees. Although a tapering portion is shown as corresponding to a plane of the bottom portions. 160 in this embodiment, in other embodiments the tapering portion may correspond to a plane of the top portions 120.

Figure 4A:
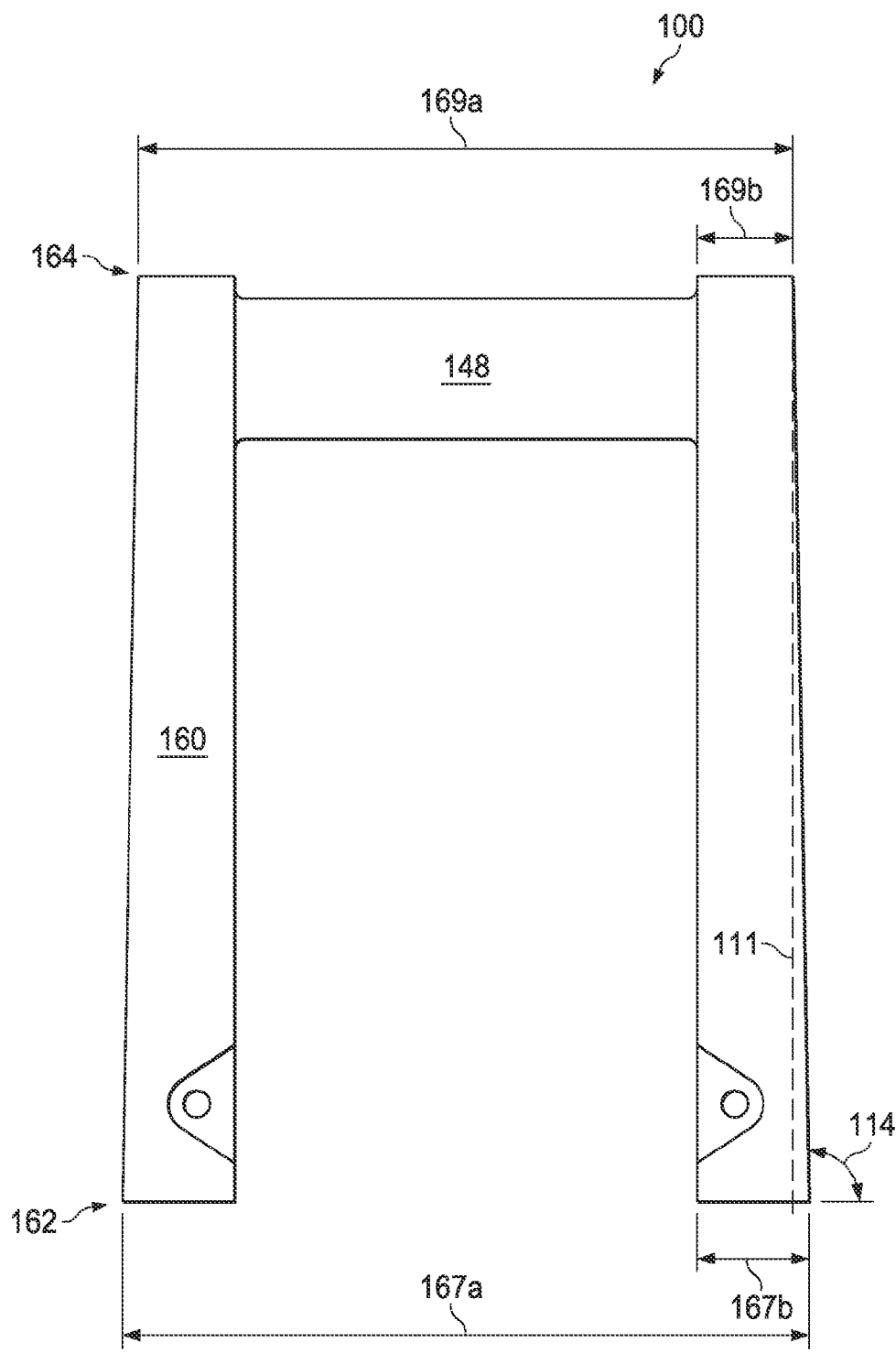
FIGS. 4A and 4B are bottom views of bottom portions of the hard drive sleeve of FIG. 1, according to an embodiment of the disclosure.
Figure 4B:
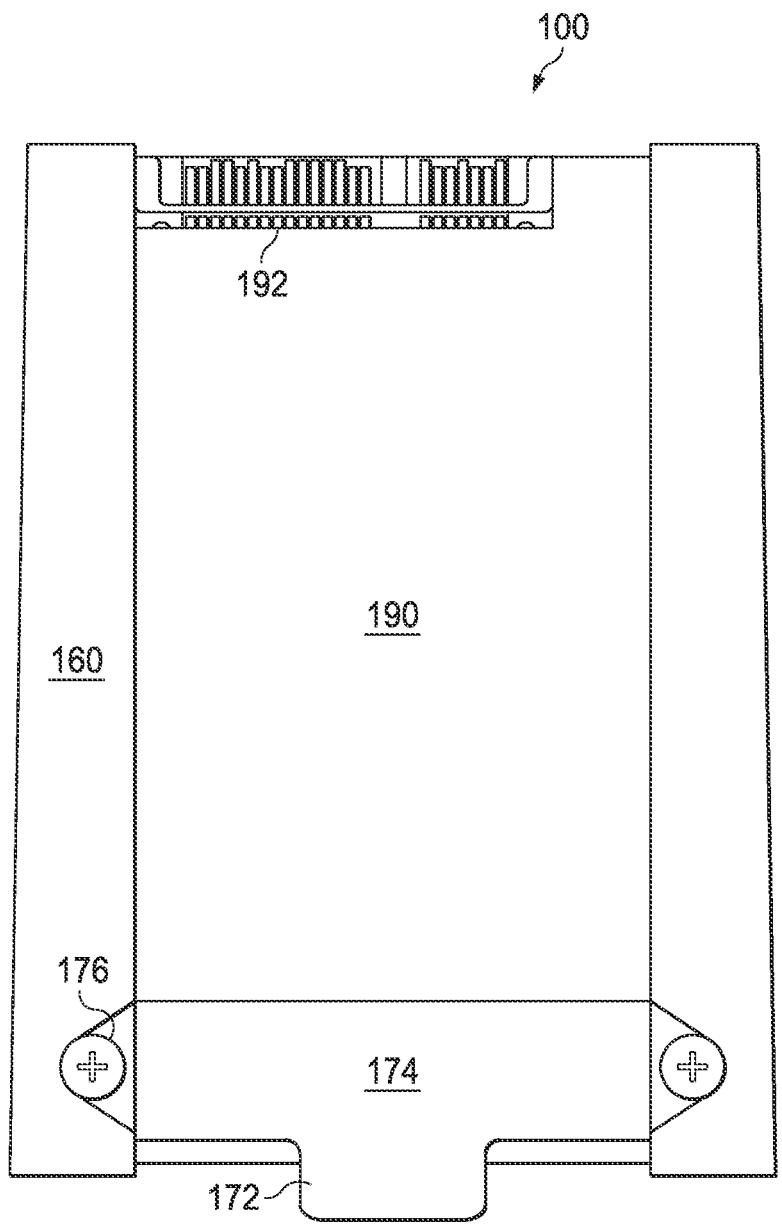

FIGS. 4A and 4B are bottom views of bottom portions 160 of the hard drive sleeve of FIG. 1. FIG. 4A, similar to FIG. 3, illustrates a slight tapering that occurs between the first end 162 and the second end 164.

As seen, a distance 167a corresponding to the first ends 162 of the bottom portions 160 is greater than a distance 169a corresponding to the second ends 164 of the bottom portions 160. A vertical line 111 illustrates how the slight tapering occurs. An angle of taper 114 when measured from a plane of the front portion 120 to a plane of the side portion 130 is between ninety and ninety-five degrees in particular embodiments. Yet other embodiments may utilize tapering greater than ninety-five degrees.

FIG. 4B shows a hard drive mounted 190 within the hard drive sleeve 100. Communication interfaces 192 are shown exposed. The communication interfaces 192 may include, but are not limited to SATA. Also shown is a pull tab 174 that has been mounted with screws 176 to selectively expose the tab 172.

Figure 5A:
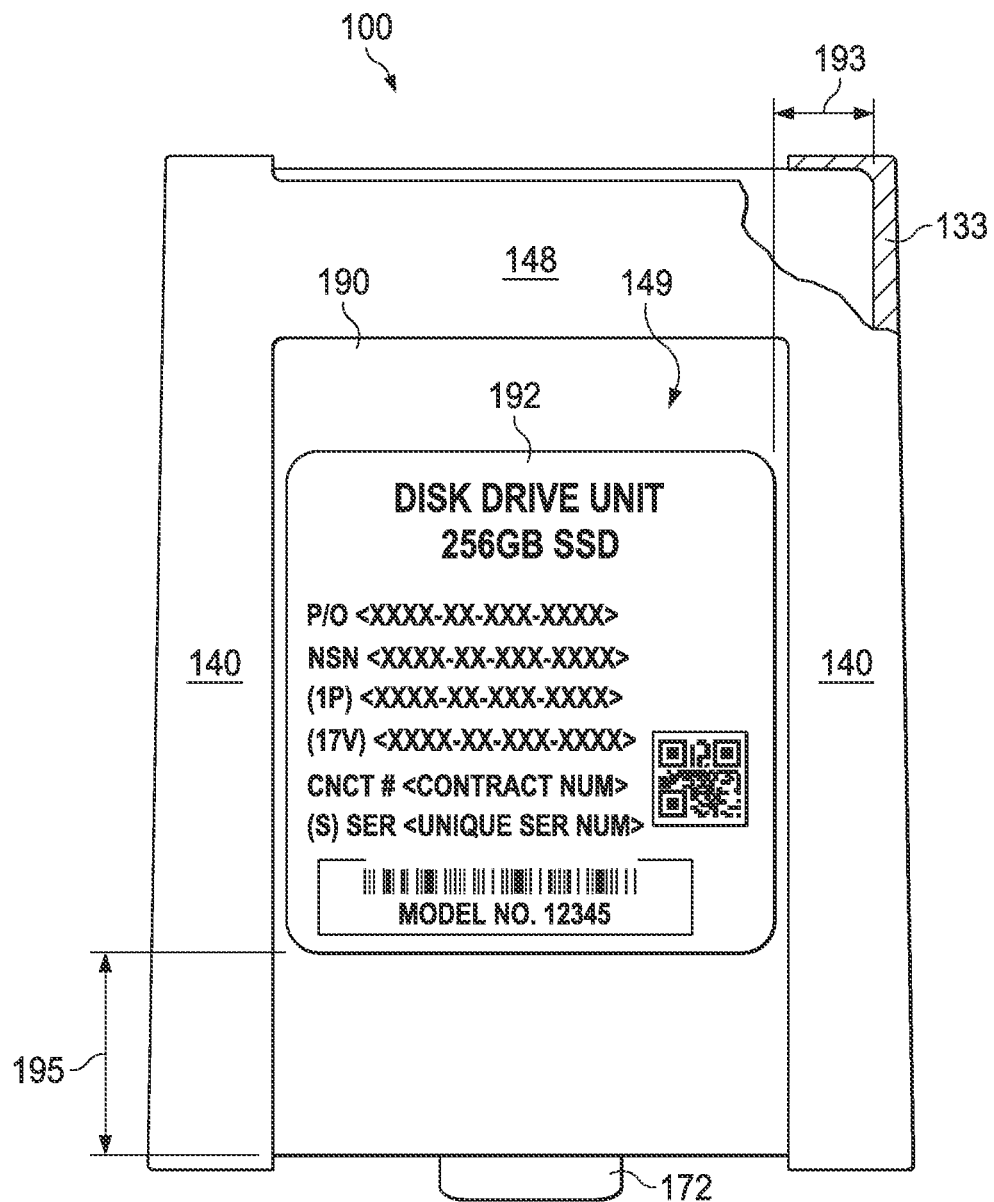
FIG. 5A illustrates how an identification plate can be exposed through the opening, according to an embodiment of the disclosure.

FIG. 5A illustrates how an identification plate 192 can be exposed through the opening 149, according to an embodiment of the disclosure. In particular embodiments, the identification plate 192 needs to easily be seen to determine details of the hard drive 190. The dimensioning of the opening 149 can respectively be determined by measuring distances 193 and 195, which correspond to the position of the identification plate with reference to the outer edges of the hard drive 190 that will abut against a wall of the hard drive sleeve 100.

Also shown is a portion of the top portion 140 removed to show how a thickness 133 of a side portion 130 begins to increase from a second end 134 toward the first end 132 in a tapering of a top portion 140. Further shown is a tab 172.

Figure 5B:
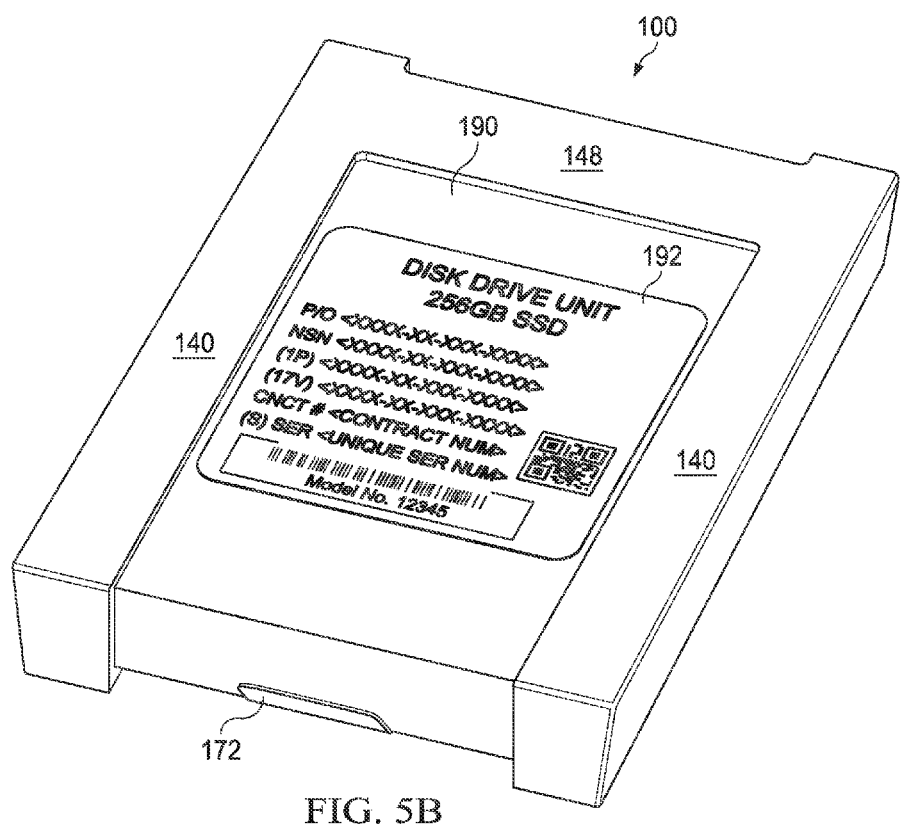
FIG. 5B shows an isometric view of a hard drive mounted within the hard drive sleeve, according to an embodiment of the disclosure.

FIG. 5B shows an isometric view of a hard drive 190 mounted within the hard drive sleeve 100, according to an embodiment of the disclosure. As seen in FIG. 5B, the tab 172 is shown at it's normal position. When user wishes to remove the yielded rugged hard drive, the tab 172 may be gripped and extended out.

Also shown is how the hard drive sleeve 100 creates a relatively low profile with respect to the hard drive 190

Figure 6A:
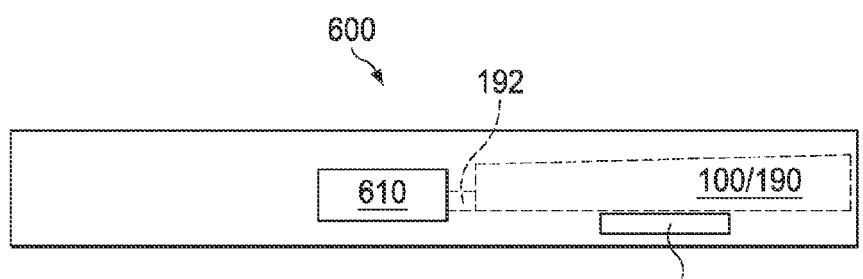
FIGS. 6A and 6B illustrate certain aspects of mounting a hard drive sleeve/hard drive combination in a computer, according to an embodiment of the disclosure.
Figure 6B:
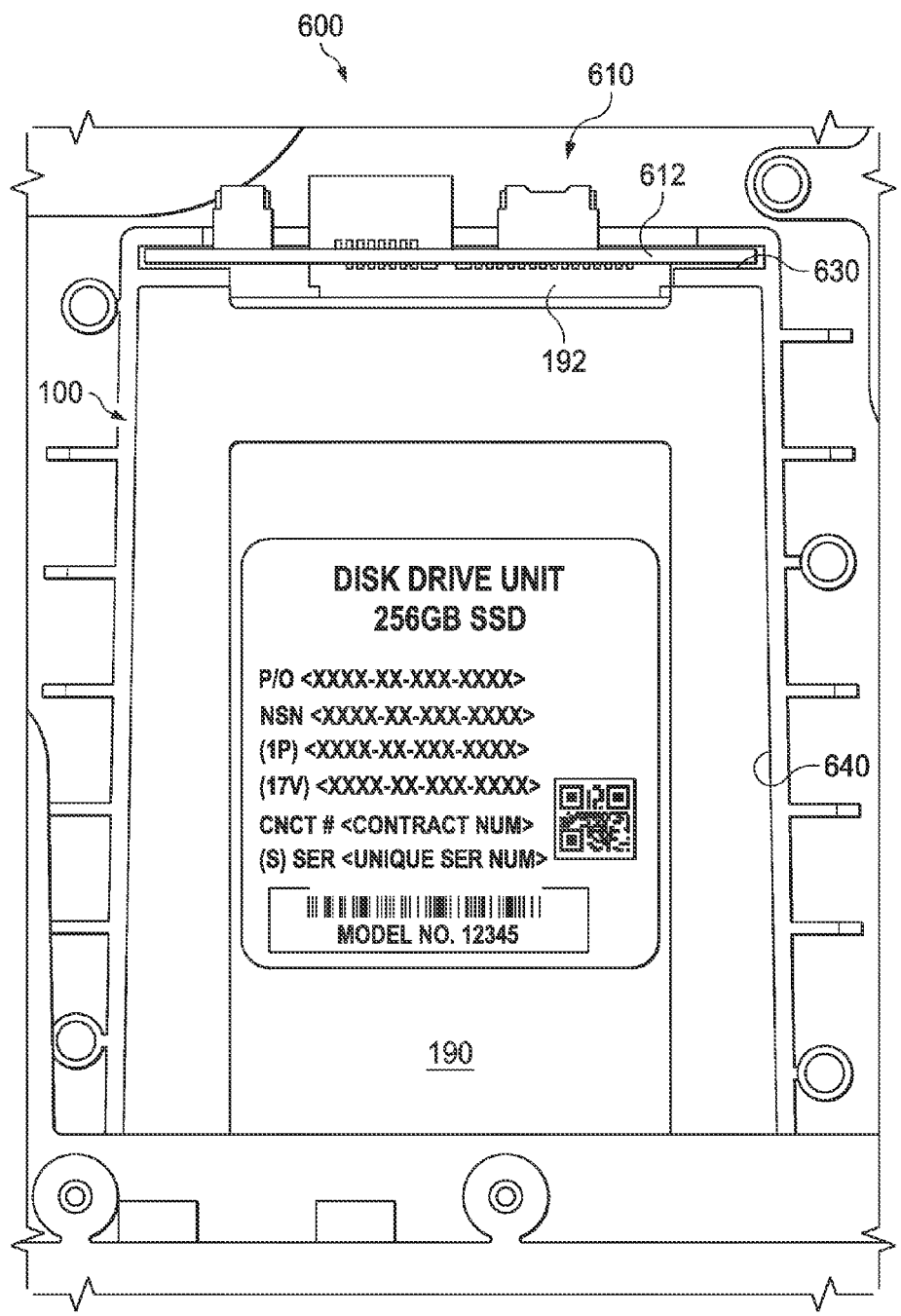

FIGS. 6A and 6B illustrate certain aspects of mounting a hard drive sleeve 100/hard drive 190 combination in a computer 600, according to an embodiment of the disclosure.

FIG. 6A shows a side block view of the mounting of the hard drive sleeve 100/hard drive 190 in the computer 600 with exaggerated boxes to illustrate features. FIGS. 6B shows a top cutaway view of the mounting of the hard drive sleeve 100/hard drive 190 in the computer 600

In conventional configurations, a removable hard drive is attached via a connector to a circuit board, which in turn is rigidly attached to the computer or tablet chassis. In such scenarios, the electrical connection between the computer and the hard drive effectively becomes a structural member. Accordingly, although the hard drive may be able to move around the cavity in which it is contained, the connector end of the hard drive is rigidly and structurally attached to the computer (via the circuit card). This can result in poor electrical connections that may periodically disconnect, especially under shocks and vibration.

Given such an undesirable phenomena, certain embodiments of the disclosure decouple a rigid connection between the chassis and the circuit card by floating a mating connector inside the chassis. In particular, by floating a mating connector inside the chassis, the hard drive and the connector are able to be rigidly attached to each other while maintaining the ability to move about inside the cavity with the shocks and vibration.

In particular embodiments, floating the mating connector avoids side loads from being applied to the connection due to mis-alignment of the connectors during insertion. For example, standard SATA (and micro-SATA) connectors are blind-mateable (in other words, they have alignment features that pull the connector into the right place if a small amount of mis-alignment exists). In particular embodiments, the computer or tablet has a cavity to contain the movement of the hard drive connector circuit card. The cavity is designed such that the hard drive connector circuit card is allowed enough freedom of movement to not bottom out during shocks and vibration, but still allow blind-mating every time. Less clearance is provided in the axis of hard drive insertion. This ensures the electrical connection is fully mated when the drive is inserted and also ensures the electrical connection un-mates when the drive is removed.

With particular reference to FIG. 6A, the hard drive sleeve 100/hard drive 190 combination is shown rigidly mounted to the body of the computer 600. Vibrations imparted upon the body of the computer 600 are at least partially absorbed by the hard drive sleeve 100. The connectors 610 of the computer that connect to the communication interface 192 float with respect to the computer 600. A heater 620, which may be used for cold temperature environments, is contained within the computer 600 and not on the hard drive sleeve 100/hard drive 190 combination. A configuration such as this allows virtually any COTS hard drive to be utilized.

With reference to FIG. 6B, a connector board 612 of the connectors 610 is shown positioned inside a connector cavity 630. The connector board 612 is not hard mounted to the chassis of the computer 600. Rather, the connector cavity 630 allows slight movement of the connector board 612 such that the connector board 612 can float along with the communication interface 192 of the hard drive 190. A variety of cabling may also be positioned between the remainder of the computer 600 and the connector board 612. Such cabling may be flexible—allowing the connector 612 to float while still communicating power to the hard drive 190 along with signaling back and forth between the hard drive 190 and the computer 600.

While allowing slight movement, the connector board 612 still allows a blind mating connection between the communication interface 192 and the connector board 612.

FIG. 6B also shows how a cavity 640 of the computer or tablet may have a similar profile to the hard drive sleeve 100. In particular configurations, when the hard drive 190 with sleeve 100 is installed, the outside profile of the sleeve 100 is a line-to-line fit inside the cavity 640 such that the hard drive 190 can't rattle around. However, the hard drive 190 can float within the sleeve 100 when the sleeve 100 compresses and absorbs shock and vibration. When such floating happens, the connector board 612 and the communication interface 192 float along with the hard drive 190.

Figure 7:
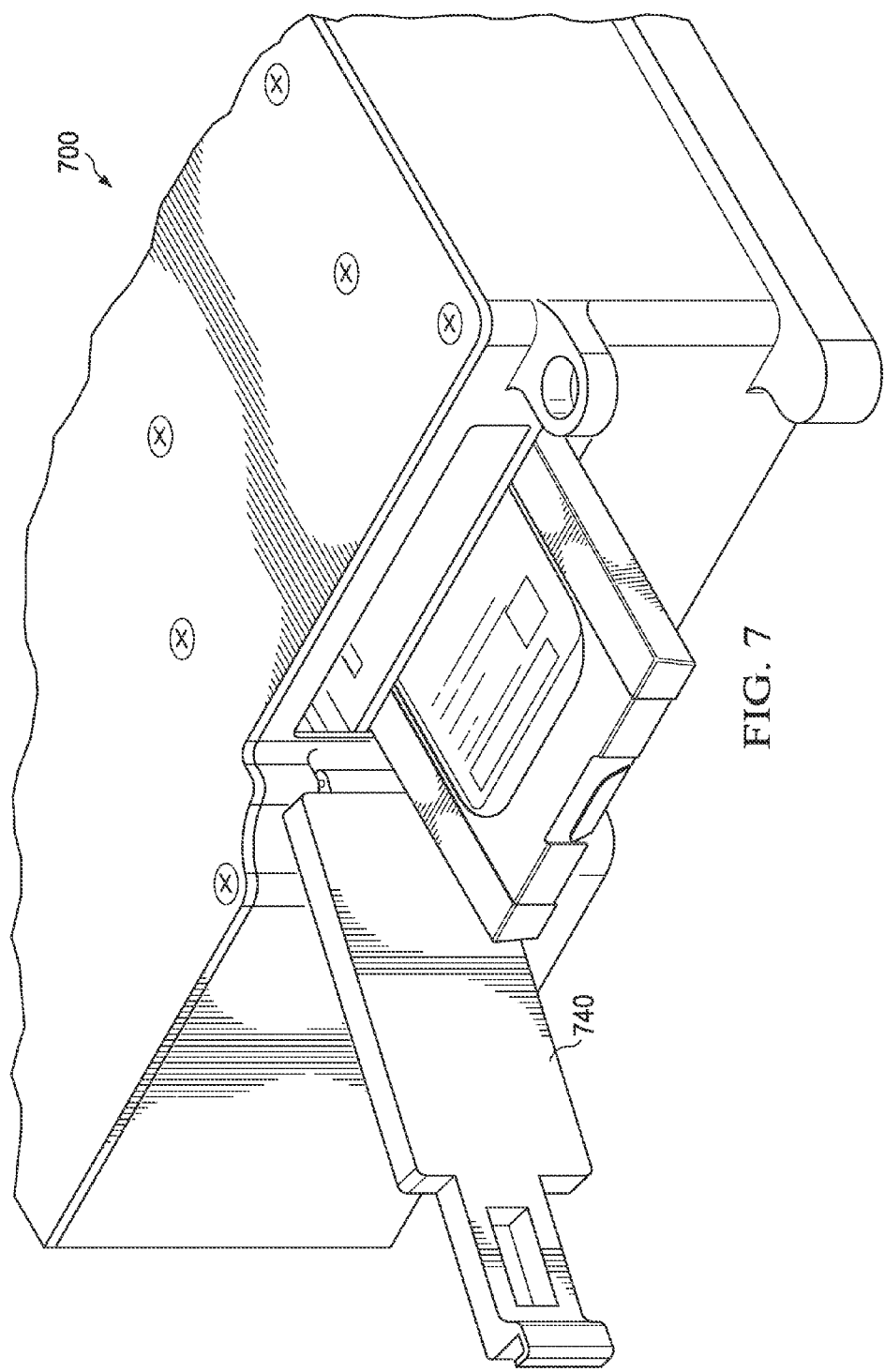

FIGS. 7 and 8 illustrate a computer 700 and a tablet 800 in which the hard drive sleeve 100/hard drive 190 combination may be placed. Each respective configuration includes a door 740, 840 that may keep the hard drive sleeve 100/hard drive 190 combination securely in place.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a sleeve configured to surround a hard drive, the sleeve comprising a side portion, a bottom portion, a top portion, a front portion, and a back portion, wherein:
at least one of the side portion, the bottom portion, the top portion, the front portion, or the back portion is made of an elastomeric material configured to absorb a portion of shock or vibration in order to prevent the portion of shock or vibration from being imparted to the hard drive, and
the sleeve is tapered in two dimensions along a length of the sleeve such that (i) a first distance across the sleeve at a first end of the sleeve, measured in a first of the two dimensions, is greater than a second distance across the sleeve at a second end of the sleeve and (ii) a third distance across the sleeve at the first end of the sleeve, measured in a second of the two dimensions, is greater than a fourth distance across the sleeve at the second end of the sleeve, wherein the first dimension and the second dimension are at right angles to each other.

2. The apparatus of claim 1, wherein the sleeve is keyed such that a combination of the sleeve and hard drive can only be inserted into a computer or tablet in one manner.

3. The apparatus of claim 2, wherein the sleeve is keyed as a trapezoidal shape.

4. The apparatus of claim 3, wherein the trapezoidal shape extends the length of the sleeve.

5. The apparatus of claim 1, wherein both the side portion and at least one of the top portion or the bottom portion are tapered.

6. The apparatus of claim 1, further comprising:
a tab extending from the sleeve or hard drive.

7. The apparatus of claim 6, further comprising:
an opening configured to expose an identification plate on the hard drive.

8. The apparatus of claim 3, wherein the hard drive is a commercial off the shelf (COTS) hard drive.

9. An apparatus comprising:
a device comprising a cavity, the cavity configured to receive a removable combination of a sleeve and a hard drive, the cavity tapered in two dimensions along a length of the cavity such that (i) a first distance across the cavity at a first end of the cavity, measured in a first of the two dimensions, is greater than a second distance across the cavity at a second end of the cavity and (ii) a third distance across the cavity at the first end of the cavity, measured in a second of the two dimensions, is greater than a fourth distance across the cavity at the second end of the cavity, wherein the first dimension and the second dimension are at right angles to each other; and
a floating connector configured to:
rigidly and communicatively connect to the hard drive, and
float with the hard drive as the sleeve of the hard drive absorbs shock or vibrations that are imparted thereon.

10. The apparatus of claim 9, further comprising the sleeve, wherein the sleeve and the cavity are keyed such that the removable combination of the sleeve and the hard drive can only be inserted into the cavity in one manner.

11. The apparatus of claim 10, wherein the sleeve and the cavity are keyed as a trapezoidal shape.

12. The apparatus of claim 9, wherein the floating connector includes a connector board, the apparatus further comprising:
a connector cavity configured to:
allow slight movement of the connector board to allow a floating of the connector board with respect to the device, and
provide structural support for a blind mating between the connector board and the hard drive.

13. The apparatus of claim 9, further comprising the sleeve, wherein at least a portion of the sleeve is made of elastomeric material.

14. The apparatus of claim 13, wherein both the sleeve and the cavity are tapered.

15. The apparatus of claim 13, further comprising:
a tab extending from the hard drive or sleeve.

16. The apparatus of claim 13, further comprising:
an opening in the sleeve configured to expose an identification plate on the hard drive.

17. The apparatus of claim 13, wherein the hard drive is a commercial off the shelf (COTS) hard drive.

18. The apparatus of claim 9, further comprising:
a heater positioned adjacent the cavity, the heater configured to supply thermal energy to the hard drive.

19. An apparatus comprising:
a hard drive; and
a sleeve surrounding the hard drive, at least a portion of the sleeve comprising an elastomeric material configured to absorb a portion of shock or vibration in order to prevent the portion of shock or vibration from being imparted to the hard drive;
wherein the sleeve is tapered in two dimensions along a length of the sleeve such that (i) a first distance across the sleeve at a first end of the sleeve, measured in a first of the two dimensions, is greater than a second distance across the sleeve at a second end of the sleeve and (ii) a third distance across the sleeve at the first end of the sleeve, measured in a second of the two dimensions, is greater than a fourth distance across the sleeve at the second end of the sleeve, wherein the first dimension and the second dimension are at right angles to each other.

20. The apparatus of claim 19, further comprising a tab extending from the hard drive or sleeve.

* * * * *